(No Model.)
A. J. KNIGHT.
LEADING DEVICE.
No. 557,832.   Patented Apr. 7, 1896.
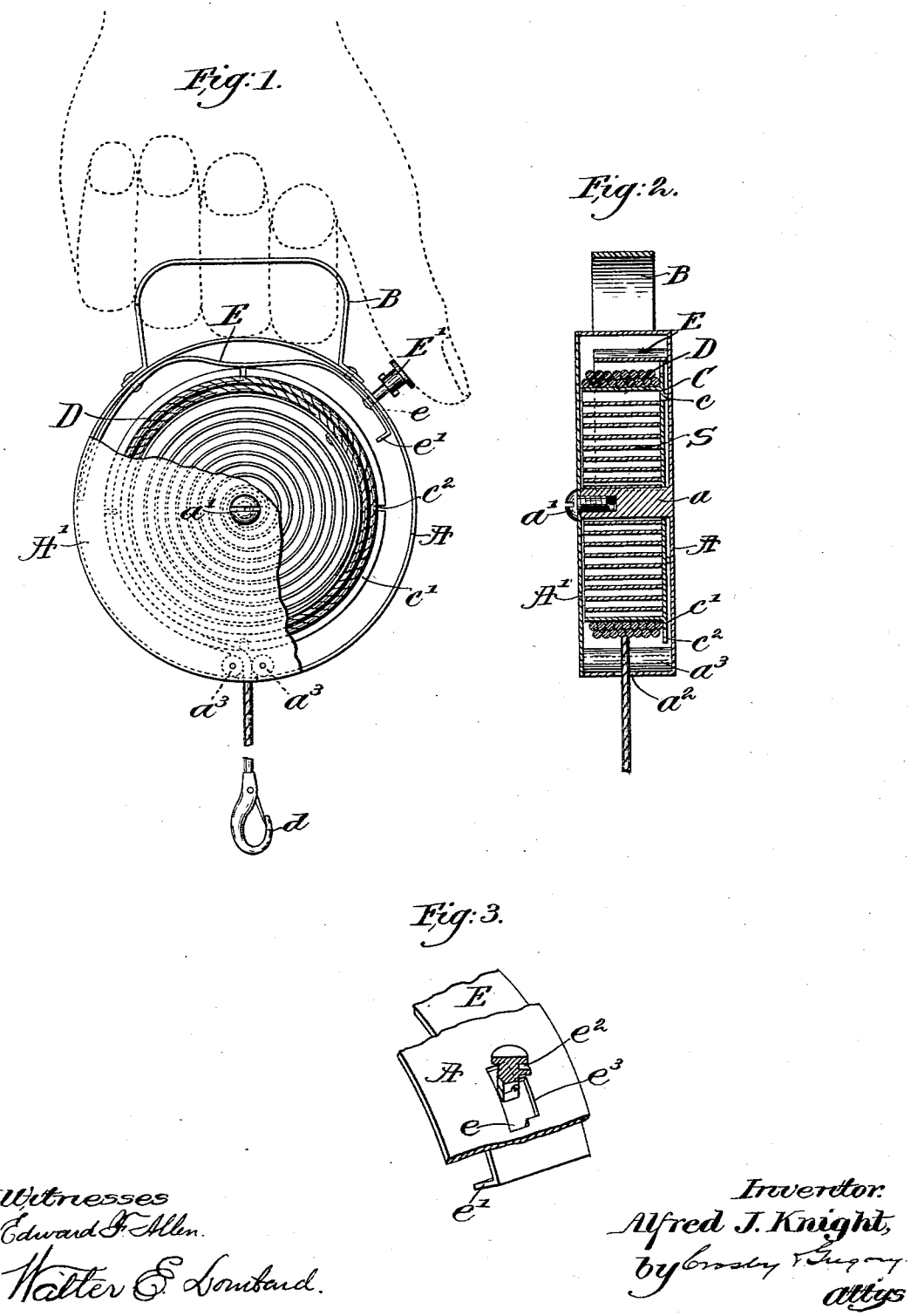
Witnesses
Edward F. Allen.
Walter E. Lombard.
Inventor
Alfred J. Knight,
by Crosby & Gregory
attys

UNITED STATES PATENT OFFICE.

ALFRED J. KNIGHT, OF BOSTON, MASSACHUSETTS.

LEADING DEVICE.

SPECIFICATION forming part of Letters Patent No. 557,832, dated April 7, 1896.

Application filed November 18, 1895. Serial No. 569,266. (No model.)

*To all whom it may concern:*

Be it known that I, ALFRED J. KNIGHT, of Boston, county of Suffolk, State of Massachusetts, have invented an Improvement in Leading Devices, of which the following description, in connection with the accompanying drawings, is a specification, like letters on the drawings representing like parts.

My invention relates to devices for leading pet dogs or other pet animals when they are taken out to accompany a person in his or her walks.

This invention is particularly adapted for ladies and is to take the place of the present inconvenient securing device, which consists simply of a chain provided at one end with a ring for the hand and at the other end with a snap-hook for the dog's collar.

It is desirable that the dog should have a certain degree of liberty, and yet, for certain reasons, it is not desirable that he should be entirely unrestrained and free to run about; but when provided with this ordinary attachment the dog will almost invariably run on the wrong side of the lamp-posts, pedestrians, and other objects met with, and thus cause much embarrassment and vexation to its owner. As a result of this unpleasant experience the owner of the dog is required to be constantly on the alert, and as soon as he or she sees that the dog is taking the wrong course at once wrap the near end of the chain or cord about the hand to give the dog less freedom. Then as soon as the object is passed the wound chain is again swung away from the hand, and this awkward and annoying performance must be repeated in accordance with the various whims and predilections of the dog.

Accordingly I have provided a small compact leading device which, while permitting the utmost freedom for the dog, enables its owner to control its movements simply by operating a stud with the thumb.

In the accompanying drawings, illustrative of the preferred form of my invention, Figure 1 is a side elevation of the complete device, partially broken away to show the internal arrangement. Fig. 2 is a central vertical cross-section of the same, and Fig. 3 is a detail of the locking-stop for the stud.

In the present embodiment of my invention I have provided an outside casing A, having a suitable handle B at the upper end, which parts may be of any light suitable material, as steel, nickeled or otherwise suitably decorated in a high degree to present a pleasing appearance for street use. This casing is preferably cylindrical in form and rigid with the handle, although I do not wish to be restricted in any way in regard to these details.

Within the casing A, I have provided a hollow reel C, centrally pivoted therein, in the present instance on a stud $a$, formed integrally with the casing and secured at its free end by means of a stub-screw $a'$, although any other means for mounting the reel concentrically within the casing may be provided. The present means, however, is deemed preferable, for the reason that it furnishes a convenient means for securing the removable cover A' of the casing. Suitable means, as knobs or small friction-rollers $c$, are provided on the rear face of the reel C or of the casing A to bear against the opposite part and minimize the friction of the moving parts. The casing is further provided with a radially-projecting annular flange or flanges $c'$, which serve to retain the leading-cord and also as a brake-surface, as presently described.

The leading cord or chain D has a snap-hook or other fastening means $d$ at its outer end and is suitably secured at its inner end to the reel C, said cord being free to travel at its lower end through a perforation $a^2$ in the lower end of the casing, its movement therethrough being further facilitated by means of friction-rollers $a^3$, suitably mounted adjacent said perforation.

If a strap should be preferred, a suitable slit will be provided instead of the hole or perforation $a^2$, as shown.

Within the hollow reel C, I have provided a coiled spring S, secured to the stud $a$ at one end and to the reel at its other end and of sufficient strength to materially aid in controlling the dog, or, if preferred, to control the dog by reason of having such a constant retracting tendency as to draw the dog back to his master or mistress.

Conveniently arranged for operation by means of the thumb or a finger of the holding-hand is a brake E, arranged to retard and control the movements of the reel C. In the present instance I have shown this brake as secured to the upper side of the casing, bent downwardly intermediate its length to bear against the flange $c'$, and having a thumb-stud or plunger $E'$ secured to its free end and operating through a slot $e$ in the casing. By means of this thumb-stud and brake the movement of the cord D, under the influence of the spring S, is controlled.

In order to lock the reel at any desired point, I have provided notches $c^2$ in the flange $c'$ and an engaging lip or detent $e'$ on the brake end, so that by a complete depression of the thumb-stud $E'$ the detent $e'$ is made to enter the first notch $c^2$ which comes under it as the reel is rotated in either direction.

In order to relieve the operator of the necessity of holding the thumb against the tension of the spring E to retain the detent $e'$ in its locking position, I have provided suitable means for locking the thumb-stud in its depressed position. For this purpose I have arranged the thumb-stud for lateral movement, and it may be loose in its connection with the spring E or suitably hinged thereabove or otherwise arranged, so that the annular groove $e^2$ thereof may be engaged in the recess $e^3$ of the slot $e$. Instead of this arrangement the thumb-stud $E'$ may be rigid with its spring, and the spring itself may have a slight lateral movement in an obvious manner.

The operation of my improved leading device is very simple. The hook $d$ is snapped into engagement with the dog's collar, and if it is desired that he should have freedom to the length of the leading chain or cord the brake is left free in its normal condition, as shown in Fig. 1, until the dog has tugged at his chain and pulled the same to its utmost extent. The thumb then presses the detent $e'$ into locking engagement with the reel, so that the spring S is prevented from exerting its constant pull on the dog to draw him back. If now it is desired to shorten the leading-cord, the thumb-stud $E'$ is allowed to spring up, and the spring S, by reason of its constant pull, causes the dog to approach, and as he does so the reel automatically takes up the leading-cord. When the cord is shortened as desired, the thumb is again pressed against the spring-brake, and the reel is locked in its adjusted position by means of the detent and notch above explained. The thumb is then given a slight lateral movement to slide the groove $e^2$ into engagement with the wall of the recess $e^3$, and the cord is then held firmly locked without the necessity and fatigue of holding down the spring E by the constant pressure of the thumb. If it is desired to give the dog limited freedom, but not to definitely restrict the length of the cord, the brake is pressed against the flange of the reel with such force as is desired, but not so as to engage the detent and notches.

It will be seen that this device is extremely neat and simple and well adapted for use even by the most fastidious. Moreover, it effectually prevents the necessity for very common and extremely awkward gyrating of the hand, as may be commonly seen on the streets when a lady undertakes to wrap the cord or chain about her hand in order to restrict her dog's movements.

I do not desire to restrict myself to the particular shape and arrangement of parts as herein shown, inasmuch as they may be modified in very many particulars without departing from the spirit and scope of my invention.

What I claim is—

1. In a device of the kind described, a reel adapted to receive a leading cord or chain, a frame therefor, a retarding-brake for said reel, means for varying the pressure of said brake at will, and a detent to lock said reel and thereby hold said cord or chain at any desired length, substantially as described.

2. The herein-described leading device, the same comprising a portable casing or frame, a handle secured thereto, a hollow reel centrally mounted within said casing, a cord or chain secured at one end to said reel and adapted to be wound thereon and extended through said casing at its other end, a spring secured to said reel and the said casing for normally retracting said cord or chain within said casing, a spring-brake arranged to engage said reel, and means for varying the pressure thereon at the will of the operator, said brake having a detent to engage locking-points provided therefor on said reel, substantially as described.

3. The herein-described leading device, the same comprising a casing, a handle secured thereto, a hollow reel centrally mounted therein, said reel being provided with an annular flange notched on its perimeter, said reel also having connected therewith a cord or chain adapted to be wound thereon and passed with its free end through a perforation in said casing, a spring within said reel arranged normally to retract said cord or chain, and a retarding spring-brake provided with a thumb-stud by which the same may be pressed into retarding engagement with said reel-flange, and also having a detent adapted to be brought into locking engagement with said notched flange by the depression of said thumb-stud, substantially as described.

4. The herein-described leading device, the same comprising a casing, a handle secured thereto, a hollow reel centrally mounted therein, said reel being provided with an annular flange notched on its perimeter, and also having connected therewith a cord or chain adapted to be wound thereon and passed with its free end through a perforation in said casing, and a spring within said reel and arranged normally to retract said cord or chain, a spring-brake provided with a thumb-stud by which the same may be pressed into retracting engagement against said reel-flange, and also having a detent adapted to be brought into locking engagement with said notched flange by the depression of said thumb-stud, and means for locking said spring-brake in its depressed and locking position, substantially as described.

In testimony whereof I have signed my name to this specification in the presence of two subscribing witnesses.

ALFRED J. KNIGHT.

Witnesses:
GEO. W. GREGORY,
MARGARET A. DUNN.